US010005140B2

(12) United States Patent
Tanaka

(10) Patent No.: US 10,005,140 B2
(45) Date of Patent: Jun. 26, 2018

(54) MACHINING APPARATUS

(71) Applicant: NIHON SHORYOKU KIKAI CO., LTD., Isesaki-shi, Gunma (JP)

(72) Inventor: Norio Tanaka, Isesaki (JP)

(73) Assignee: NIHON SHORYOKU KIKAI CO., LTD., Isesaki-shi, Gunma (JP)

( * ) Notice: Subject to any disclaimer, the term of this patent is extended or adjusted under 35 U.S.C. 154(b) by 230 days.

(21) Appl. No.: 14/392,180

(22) PCT Filed: Jul. 9, 2013

(86) PCT No.: PCT/JP2013/068721
§ 371 (c)(1),
(2) Date: Dec. 23, 2015

(87) PCT Pub. No.: WO2015/004727
PCT Pub. Date: Jan. 15, 2015

(65) Prior Publication Data
US 2016/0184905 A1    Jun. 30, 2016

(51) Int. Cl.
*B23D 79/02* (2006.01)
*B23Q 3/18* (2006.01)
(Continued)

(52) U.S. Cl.
CPC ............... *B23C 3/12* (2013.01); *B23C 3/002* (2013.01); *B23C 3/005* (2013.01); *B23C 5/10* (2013.01);
(Continued)

(58) Field of Classification Search
CPC ....... B23C 2220/16; B23C 3/12–3/128; B23C 2220/40; B25J 11/006; B25J 11/0055;
(Continued)

(56) References Cited

U.S. PATENT DOCUMENTS 3,922,951 A * 12/1975 Linsinger ................. B23C 3/12
409/138
3,977,298 A * 8/1976 Linsinger ................. B23C 3/12
409/138
(Continued)

FOREIGN PATENT DOCUMENTS

CN    202877589 U    4/2013
CN    103143759 A    6/2013
(Continued)

OTHER PUBLICATIONS

EP search report of EP application No. 13889126 dated Sep. 27, 2016.
(Continued)

*Primary Examiner* — Erica E Cadugan
(74) *Attorney, Agent, or Firm* — Muncy, Geissler, Olds & Lowe, P.C.

(57) ABSTRACT

A machining apparatus capable of performing chamfering with high precision is provided. A machining unit 13 is provided at a distal end portion 12*a* of an arm 12 of an articulated robot 11, and the machining unit 13 includes a profiling roller 57, which serves as a roller that abuts against a part to be profiled Wd of a workpiece W, and a rotatable tool 41 having an axis line 41*a* having a distance between the rotatable tool 41 and the profiling roller 57 in conformity with a width of the workpiece W (width of a band-like portion Wc) and extending in parallel with an axis line 57*a* corresponding to a support axis of the profiling roller 57, and the rotatable tool 41 includes cutting blades 41*b* or blade portions 73 and 73 as chamfering blades.

13 Claims, 11 Drawing Sheets

(51) Int. Cl.
*B23C 3/12* (2006.01)
*B23C 3/00* (2006.01)
*B25J 11/00* (2006.01)
*B23C 5/10* (2006.01)
*B23C 5/12* (2006.01)

(52) U.S. Cl.
CPC ............ *B23D 79/02* (2013.01); *B25J 11/005* (2013.01); *B25J 11/006* (2013.01); *B23C 2210/02* (2013.01); *B23C 2210/242* (2013.01); *B23C 2210/244* (2013.01); *B23C 2220/16* (2013.01); *B23C 2220/40* (2013.01); *B23C 2265/08* (2013.01); *Y10T 29/5182* (2015.01); *Y10T 409/304144* (2015.01); *Y10T 409/304256* (2015.01); *Y10T 409/50164* (2015.01); *Y10T 409/50246* (2015.01)

(58) Field of Classification Search
CPC ........... B23D 79/02; Y10T 409/304144; Y10T 409/501476; Y10T 409/50164; Y10T 409/3042; Y10T 409/304256
USPC ................ 409/138, 303, 297, 298, 139–140; 29/33 A
See application file for complete search history.

(56) References Cited

U.S. PATENT DOCUMENTS

| | | | |
|---|---|---|---|
| 4,018,134 A | | 4/1977 | Linsinger |
| 4,604,011 A | * | 8/1986 | Rungger ................... B23C 3/12 409/138 |
| 4,648,762 A | | 3/1987 | Hall et al. |
| 5,327,686 A | | 7/1994 | Park et al. |
| 5,752,402 A | | 5/1998 | Barnes |
| 5,765,975 A | * | 6/1998 | Hoffmann ............ B25J 15/0616 409/138 |
| 5,921,729 A | * | 7/1999 | Kikuchi .................... B23C 3/12 409/138 |
| 5,931,071 A | * | 8/1999 | Mori ........................ B26D 3/10 83/582 |
| 7,704,023 B2 | * | 4/2010 | Cheung ................ B26D 1/0006 409/138 |
| 2016/0167144 A1 | * | 6/2016 | Engrand ................ B23D 79/02 409/303 |

FOREIGN PATENT DOCUMENTS

| | | | |
|---|---|---|---|
| DE | 3536949 A1 | * | 4/1987 |
| GB | 2145020 A | | 3/1985 |
| JP | 60-238211 A | * | 11/1985 |
| JP | 5-111861 A | | 5/1993 |
| JP | 8-85011 A | | 4/1996 |
| JP | 3020060 B | | 3/2000 |
| JP | 2002-370116 A | | 12/2002 |
| JP | 2006-142434 A | | 6/2006 |
| TW | 445940 | | 7/2001 |
| TW | M423024 U1 | | 2/2012 |

OTHER PUBLICATIONS

Office Action of the corresponding Chinese application No. 201380077226.5 dated Aug. 9, 2016 together with English translation thereof.
International Search Report for PCT/JP2013/068721 dated Aug. 6, 2013.
Written Opinion of the International Searching Authority for PCT/JP2013/068721 dated Aug. 6, 2013.
International Preliminary Report on Patentability for PCT/JP2013/068721 dated Jan. 21, 2016.
Office Action of a corresponding Taiwanese Patent Application No. 103121866 dated Oct. 2, 2015.

* cited by examiner

FIG.11
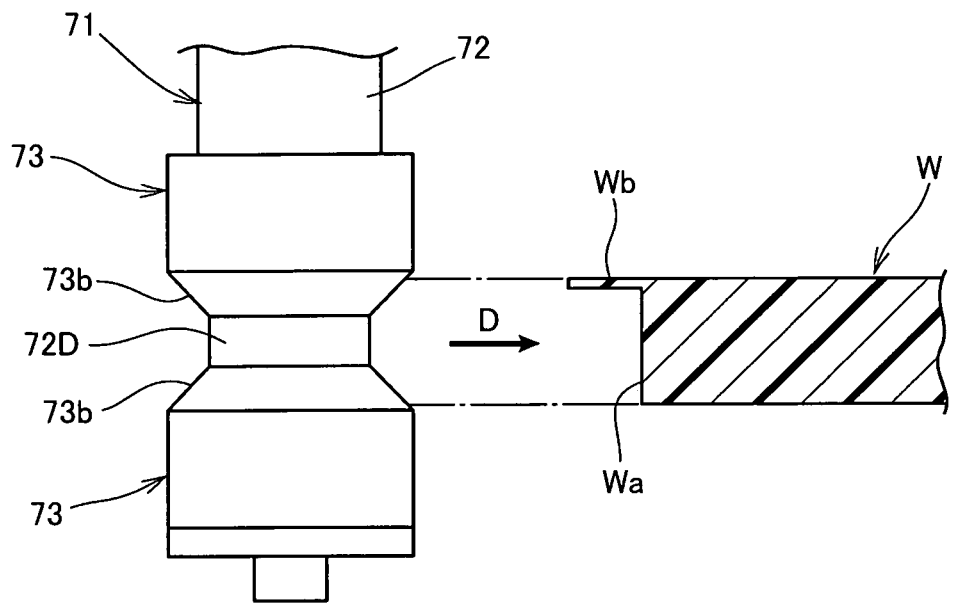
(A)
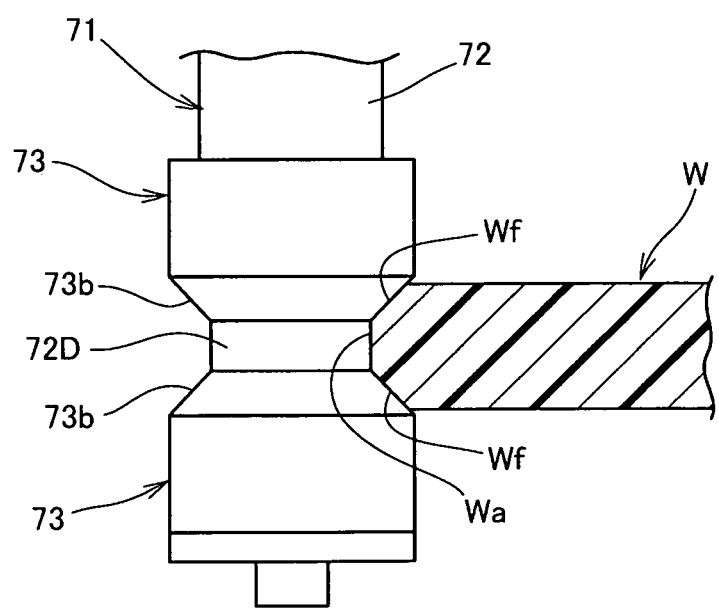
(B)

MACHINING APPARATUS

TECHNICAL FIELD

The present invention relates to a machining apparatus that machines a workpiece while profiling a part of the workpiece.

BACKGROUND ART

Conventionally, as machining apparatuses that automatically perform chamfering or deburring of a workpiece, ones in which a rotatable tool is attached to the distal end side of an arm of an articulated robot and chamfering or deburring of a workpiece fixed on a jig is performed by the rotatable tool are known (see, for example, Patent Literature 1). At the distal end of the arm of the articulated robot, a profiling guide roller that contacts with a profiling reference surface of the workpiece, and the rotatable tool attached to the profiling guide roller side are provided, and with the profiling guide roller in contact with the profiling reference surface of the workpiece, the rotatable tool removes a burr at the surface of the workpiece.

CITATION LIST

Patent Literature

Patent Literature 1: Japanese Patent No. 3020060

SUMMARY OF INVENTION

Technical Problem

In recent years, composite materials with the strength enhanced by incorporation of fibers in a plastic such as FRP (Fiber Reinforced Plastics), CFRP and GFRP have emerged and extensively used in various industrial products. Resin products using such composite materials have the problem of difficulty in fixing their dimensions during molding, resulting in difficulty in secondary processing.

In conventional techniques, for example, a long workpiece with a burr at one side edge in a longitudinal direction and a profiling reference surface at another side edge provides difficulty in removing the burr. Also, there is the problem that if the width dimension of the long workpiece varies in the longitudinal direction or the thickness of the workpiece varies in the longitudinal direction, the removal of the burr is more difficult.

In the case of the aforementioned long workpiece, it is often required to not only remove the burr at the one side edge but also chamfer the side edge part simultaneously with the burr removal; however, no machining apparatuses for such purpose have been developed and existed.

The present invention has been made in view of the aforementioned circumstances, and an object of the present invention is to provide a machining apparatus capable of performing secondary processing with high precision.

Solution to Problem

In order to solve the aforementioned problems, the present invention provides a machining apparatus for machining a workpiece including a surface to be machined at one side edge and a part to be profiled at another side edge, wherein a machining unit is moved in a state that the workpiece is held between a machining tool and a profiling member in the machining unit, the profiling member abutting against the part to be profiled, and the surface to be machined of the workpiece is machined by the machining tool.

In this case, it is possible that the machining unit includes a roller that abuts against the part to be profiled of the workpiece, and a machining tool having a distance between the machining tool and the roller in conformity with a width of the workpiece and extending in parallel with a support axis of the roller.

In the present invention, a workpiece is machined in a state that the workpiece is held between the profiling member (roller) and the machining tool, and thus, even in the case of a resin product having difficulty in fixing its dimensions during molding, its dimension accuracy can be maintained, enabling secondary processing to be performed with high precision.

The machining tool includes a cutting blade facing the profiling member (roller).

It is possible that the machining apparatus includes an actuator capable of varying the distance between the roller and the machining tool.

Also, it is possible that control data for the actuator and control data for the robot are synchronized.

In the present invention, the distance between the roller and the machining tool is varied by the actuator, and thus, the present invention is applicable to machining a workpiece whose width dimension varies in a longitudinal direction, enabling secondary processing with high precision.

In the above configuration, it is possible that the roller and the machining tool are integrally supported by a movable body, and the movable body is joined to a base body of the machining unit via a first floating mechanism.

Also, it is possible that a slider is joined to the base body of the machining unit via the first floating mechanism, and the movable body is joined to the slider via a second floating mechanism.

Even if the workpiece deforms so as to undulate in a width direction or a thickness direction, the functions of the first floating mechanism and the second floating mechanism allow the roller and the machining tool to follow the undulating deformation, enabling secondary processing to be performed with high precision.

It is possible that the machining unit includes a workpiece pinching jig including a pair of rollers, and the workpiece is machined in a state that the workpiece is held between the pair of rollers.

It is possible that the pair of rollers is moved to open/close via a centering mechanism.

Even if the thickness of the workpiece varies in the longitudinal direction, the function of the pinching jig allows the roller and the machining tool to follow the variation, enabling secondary processing to be performed with high precision.

It is possible that the machining tool is a rotatable tool.

For the rotatable tool, any of various tools such as end mills and rotary burrs can be employed.

It is possible that the rotatable tool includes a chamfering blade.

It is possible that the chamfering blade includes a pair of blade portions spaced from each other in an axial direction.

Also, it is possible that the machining tool is a scraper, and it is possible that the scraper includes a chamfering blade.

It is possible that the machining unit includes a rotatable tool including a pair of blade portions spaced from each other in an axial direction and a reference profiling portion that abuts against the workpiece between the blade portions, the profiling member is fixed-type, the machining unit is moved in a state that the workpiece is held between the fixed profiling member and the reference profiling portion of the rotatable tool, and the surface to be machined of the workpiece is machined by the machining tool.

It is possible that the rotatable tool is supported by a movable body, and the movable body is joined to a base body of the machining unit via a first floating mechanism.

It is possible that a slider is joined to the base body of the machining unit via the first floating mechanism, and the movable body is joined to the slider via a second floating mechanism.

It is possible that the machining unit includes a workpiece pinching jig including a pair of rollers, and the chamfering blade and the workpiece are positioned in a state that the workpiece is held between the pair of rollers.

It is possible that the pair of rollers is moved to open/close via a centering mechanism.

Advantageous Effect of Invention

In the present invention, a machining unit is moved in a state that a workpiece is held between a machining tool and a profiling member in the machining unit, the profiling member abutting against a part to be profiled, and a surface to be machined of the workpiece is machined by the machining tool, and the present invention thus enables secondary processing of, for example, even a product whose dimensions are difficult to fix during molding like a resin product using any of the aforementioned composite materials to be performed with high precision while regular dimensions being maintained.

BRIEF DESCRIPTION OF DRAWINGS

FIG. 11 includes operation diagrams illustrating chamfering via the rotatable tool: FIG. 11(A) is a diagram illustrating a state before chamfering; and FIG. 11(B) is a diagram illustrating a state during chamfering.

DESCRIPTION OF EMBODIMENTS

Embodiments of the present invention will be described below with reference to the drawings.

First Embodiment

Figure 1:
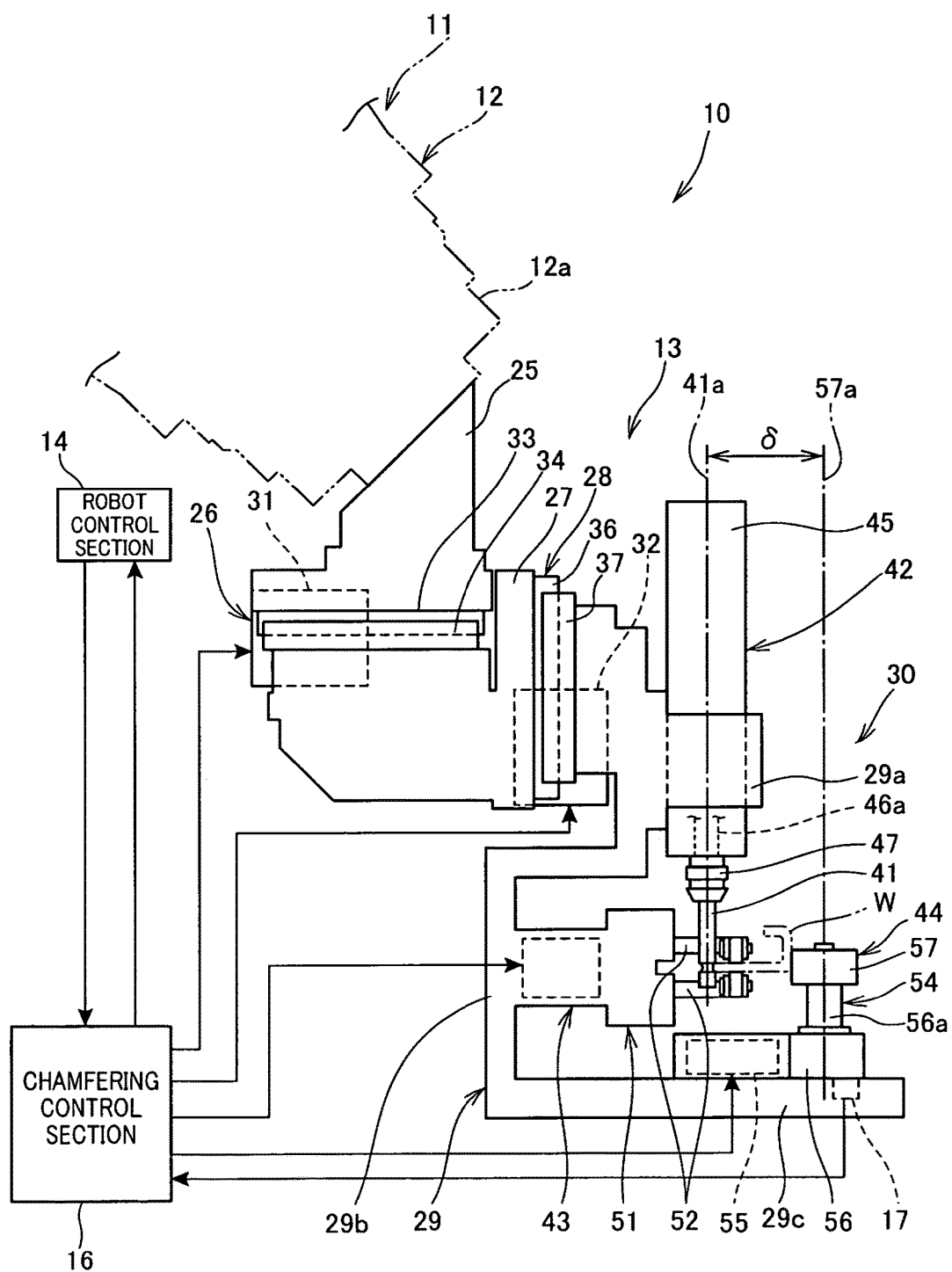
FIG. 1 is a diagram illustrating a machining apparatus according to a first embodiment of the present invention.

FIG. 1 is a side view of a machining apparatus 10 according to a first embodiment of the present invention.

Figure 4:
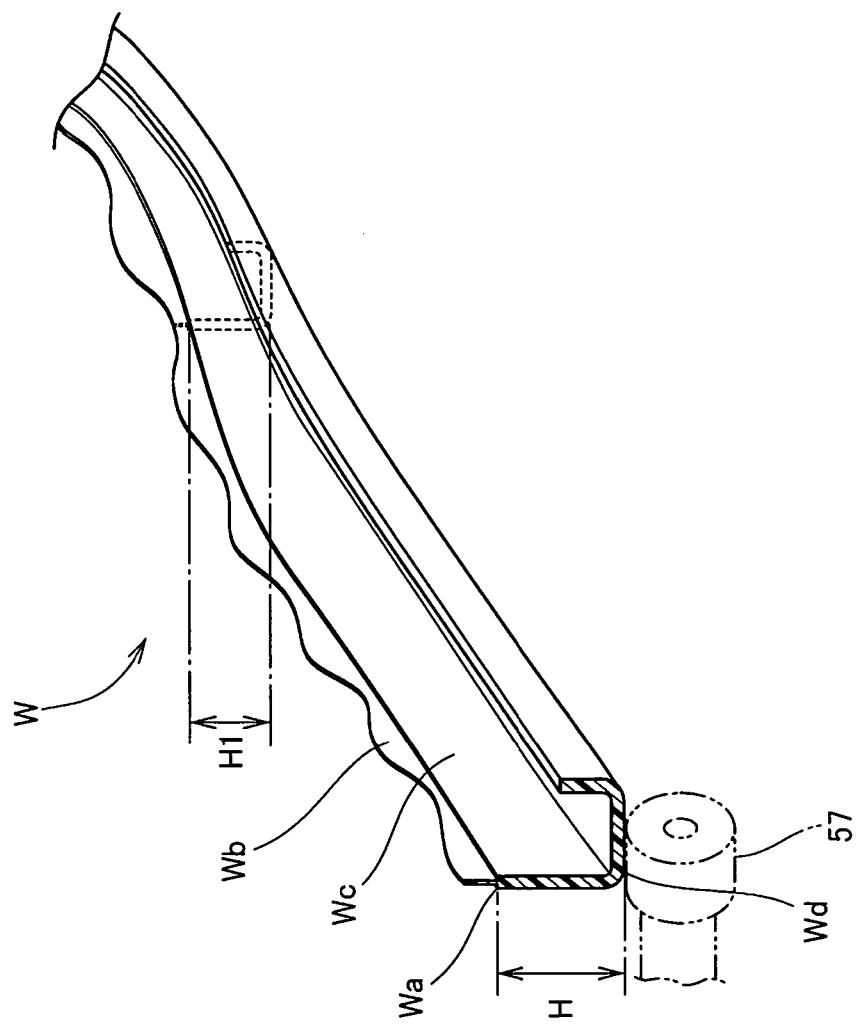
FIG. 4 is a perspective view of an example of a workpiece, which is an object to be machined by a machining unit.

The machining apparatus 10 is a machining apparatus employed for a workpiece W including a surface to be machined (end surface) Wa at one side edge and a part to be profiled Wd at another side edge (see, for example, FIG. 4).

The machining apparatus 10 includes an articulated robot 11 (robot), a machining unit 13 attached to a distal end portion 12a of an arm 12 of the articulated robot 11, a robot control section 14 that controls operation of a plurality of arms included in the articulated robot 11, a chamfering control section 16 that controls operation of the machining unit 13, and a position sensor 17 that detects a position of a movable portion (which will be described in detail later) of the machining unit 13.

In the articulated robot 11, for example, the plurality of arms and respective portions other than the arms include parts extending along an axis and parts being perpendicular to an axis. The parts extending along an axis each pivot around the axis, and the parts being perpendicular to an axis swing around the axis. The articulated robot 11 is a six-axis type one including six axes such as described above, and translates the machining unit 13 in three dimensions, and pivots and swings the machining unit 13 around the respective axes.

The robot of the machining apparatus 10 is not limited to an articulated robot of, e.g., the six-axis type, and may be, for example, a fixed-type robot.

The machining unit 13 is, for example, a device that performs cutting such as chamfering (c chamfer) or rounding (round chamfer) of an end surface of a workpiece W formed by resin molding, or removes a burr formed at the end surface of the workpiece W during the molding. In the present description, chamfering includes not only removal of an edge of an end surface of a workpiece but also, e.g., forming a round part We in the entire end surface.

More specifically, the machining unit 13 includes a base body 25, a first slide mechanism 26, a slider 27, a second slide mechanism 28, a movable body 29 and a machining section 30, which are provided in this order from the distal end portion 12a side of the arm 12, and a pneumatic (or hydraulic) first cylinder device 31 and a pneumatic (or hydraulic) second cylinder device 32.

The base body 25 is a part attached to the distal end portion 12a of the arm 12. The first slide mechanism 26 includes an upper rail 33 fixed to a lower portion of the base body 25, and a lower rail 34 slidably attached to the upper rail 33 and fixed to an upper portion of the slider 27. Movement of the upper rail 33 and the lower rail 34 relative to each other is performed by the base body 25 or the first cylinder device 31 fixed to the slider 27.

The second slide mechanism 28 includes a slider-side rail 36 fixed to a side portion of the slider 27, and a movable body-side rail 37 slidably attached to the slider-side rail 36 and fixed to a side portion of the movable body 29. Movement of the slider-side rail 36 and the movable body-side rail 37 relative to each other is performed by the slider 27 or the second cylinder device 32 fixed to the movable body 29.

The machining section 30 includes a machining body portion 42 fitted with a rotatable tool 41, a pinching unit 43 that pinches a workpiece W, and a profiling unit 44 that profiles the workpiece W.

The machining body portion 42 includes a drive motor 46 fixed to an upper portion 29a of the movable body 29, and the rotatable tool 41 detachably attached to a rotation shaft 46a of the drive motor 46 via a chuck 47.

The pinching unit 43 includes a pneumatic (or hydraulic) centering cylinder device 51 fixed to an intermediate portion 29b of the movable body 29, and a pair of pinching portions 52 and 52 detachably attached to the centering cylinder device 51.

The centering cylinder device 51 has a function that centers the pair of pinching portions 52 and 52 in a vertical direction in the figure. The pair of pinching portions 52 and 52 is centered by the centering cylinder device 51 while pinching a workpiece W therebetween, enabling the workpiece W to be positioned relative to the rotatable tool 41.

The profiling unit 44 includes a profiling body portion 54 slidably provided on a lower portion 29c of the movable body 29, and a pneumatic (or hydraulic) profiling cylinder device 55 fixed to the lower portion 29c of the movable body 29 in order to slide the profiling body portion 54.

The profiling body portion 54 includes a base portion 56 slidably attached to the lower portion 29c of the movable body 29, a spindle 56a attached to the base portion 56, and a profiling roller 57 rotatably supported by a distal end portion of the spindle 56a. The profiling roller 57 is desirably able to reduce friction during rotation also for preventing a surface to be profiled of a workpiece W from being scratched, and preferably is, for example, a ball bearing using an inner race and an outer race. However, if the workpiece W is one formed of a material having high strength and high resistance to scratching, a fixed shaft, a spherical body or the like may be used instead of the profiling roller 57.

While the profiling roller 57 abuts against the part to be profiling of the workpiece W, the workpiece W is chamfered and deburred by the rotatable tool 41 of the machining body portion 42. A distance δ between an axis line 41a of the rotatable tool 41 and an axis line 57a of the profiling roller 57 can be adjusted by moving the profiling body portion 54 via the profiling cylinder device 55.

The chamfering control section 16 controls opening/closing of respective solenoid valves included in the first cylinder device 31, the second cylinder device 32, the centering cylinder device 51 and the profiling cylinder device 55, and thereby controls air pressure (or oil pressure) supplied to the respective cylinder devices to control actuation of the respective cylinder devices.

The robot control section 14 includes a storage section that stores robot control data for controlling the articulated robot 11, and the robot control data is stored in the storage section.

Examples of the robot control data include data on a shape of the workpiece W according to teaching, a machining path (path information) of the rotatable tool 41, and pivoting and swinging angle data for the arms and the parts other than the arms of the articulated robot 11, the pivoting and swinging angle data corresponding to the shape data and the machining path.

The chamfering control section 16 includes a storage section that stores chamfering control data for controlling the machining unit 13, and the chamfering control data is stored in the storage section.

Examples of the chamfering control data include an amount of sliding of the first slide mechanism 26 by the first cylinder device 31, an amount of sliding of the second slide mechanism 28 by the second cylinder device 32, a timing for centering via the centering cylinder device 51, and the distance δ determined via the profiling cylinder device 55.

The robot control section 14 and the chamfering control section 16 synchronize the robot control data and the chamfering control data with each other, for example, synchronize coordinate data on the distal end portion 12a of the arm 12; and coordinates of a blade portion of the rotatable tool 41 of the machining unit 13 and presence or absence of performing of chamfering and deburring corresponding to these coordinates; to be in accordance with, e.g., the data on the shape of the workpiece W stored in the storage section of the robot control section 14, and thus, to perform chamfering and deburring of the workpiece W.

Figure 2:
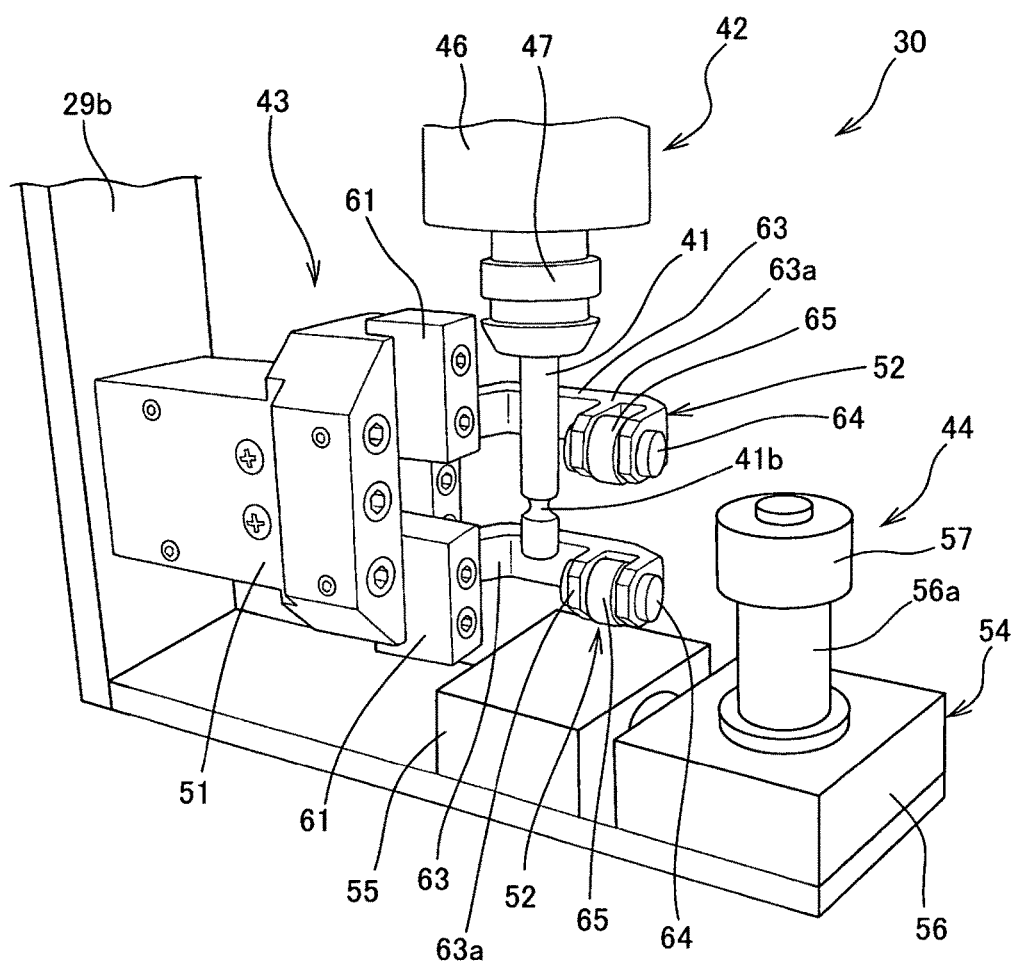
FIG. 2 is a perspective view of a major portion of a machining unit.

FIG. 2 is a perspective view of a major part of the machining unit 13.

The rotatable tool 41 of the machining body portion 42 includes two cutting blades 41b formed in a recessed shape in order to perform chamfering and deburring of an end surface of the workpiece W (see FIG. 1), which are integrally formed at a distal end portion thereof. The number of cutting blades 41b of the rotatable tool 41 is not limited to two and may be, e.g., three or four if such three or four blades can be disposed on the tool body.

The centering cylinder device 51 of the pinching unit 43 includes a pair of jaw portions 61 and 61 at an end portion thereof, and these jaw portions 61 and 61 are joined to a single cylinder portion embedded in the centering cylinder device 51 via a part of arm members embedded respectively in the centering cylinder device 51. Upon the single cylinder portion being actuated pneumatically or hydraulically, the jaw portions 61 and 61 are moved by a same distance in directions in which the jaw portions 61 and 61 move closer to each other or away from each other, via the pair of arm members.

A pinching portion 52 is attached to a distal end of each jaw portion 61. Each pinching portion 52 includes a U-shape pinching arm 63, a pinching roller 65 rotatably supported by a forked portion 63a at a distal end of the pinching arm 63 via a spindle 64, and a retaining ring (not illustrated) that prevents the spindle 64 from coming away.

Figure 3:
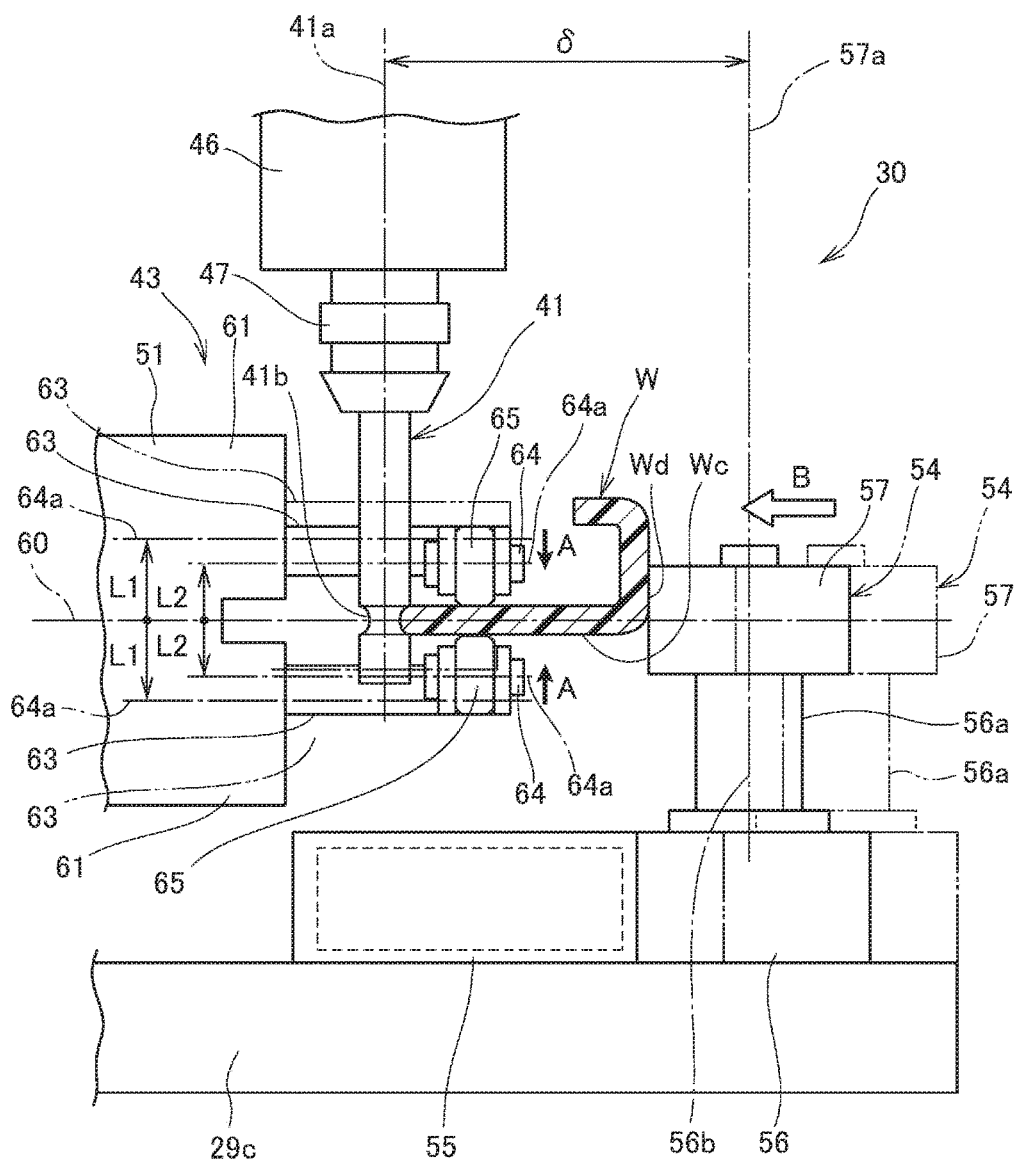
FIG. 3 is a side view of the major part of a machining unit.

FIG. 3 is a side view of the major part of the machining unit 13.

An axis line 64a of each spindle 64 of the pinching unit 43 extends in a direction orthogonal to the axis line 41a of the rotatable tool 41.

A blade portion center line 60 extends through a center in a width of the cutting blades 41b of the rotatable tool 41 (center of the cutting blades 41b in a longitudinal direction of the rotatable tool 41). The axis lines 64a and 64a of the spindles 64 and 64, which are respective centers of rotation of the pair of pinching rollers 65 and 65, are each vertically spaced from the blade portion center line 60 by a distance L2, and in this state, the workpiece W is held by the pair of pinching rollers 65 and 65.

Before the workpiece W is hold by the pinching rollers 65 and 65, the axis lines 64a and 64a of the spindles 64 and 64 are each vertically spaced from the blade portion center line 60 by a distance L1.

A spindle axis 56b of the spindle 56a of the base portion 56 and the axis line 57a of the profiling roller 57 in the profiling unit 44 correspond to each other, and these axes 56b and 57a are perpendicular to the blade portion center line 60.

An end surface Wa (see FIG. 5) of the workpiece W is subjected to chamfering. When the workpiece W is obtained by molding using a resin molding die, if a burr Wb (see FIG. 5) is formed at a part of the end surface Wa corresponding to a parting part, chamfering of the end surface Wa and removal of the burr Wb are performed simultaneously.

FIG. 4 is a perspective view of an example of the workpiece W, which is an object to be machined by the machining unit.

The workpiece W is, for example, one molded in a plate-like shape having bends, and includes a band-like portion Wc at an edge portion, the band-like portion Wc having a height (or width) varying from H to H1 at a position partway therethrough and further to a height that is smaller than H1.

The band-like portion Wc includes the end surface Wa and the part to be profiled Wd set at a distal end portion of a bend portion. In each of FIGS. 3 and 4, in chamfering and deburring, the rotatable tool 41 (see FIG. 3) is brought into abutment with the end surface Wa and the profiling roller 57 is brought into abutment with the part to be profiled Wd. A burr Wb is formed, for example, continuously at the end surface Wa.

Figure 5:
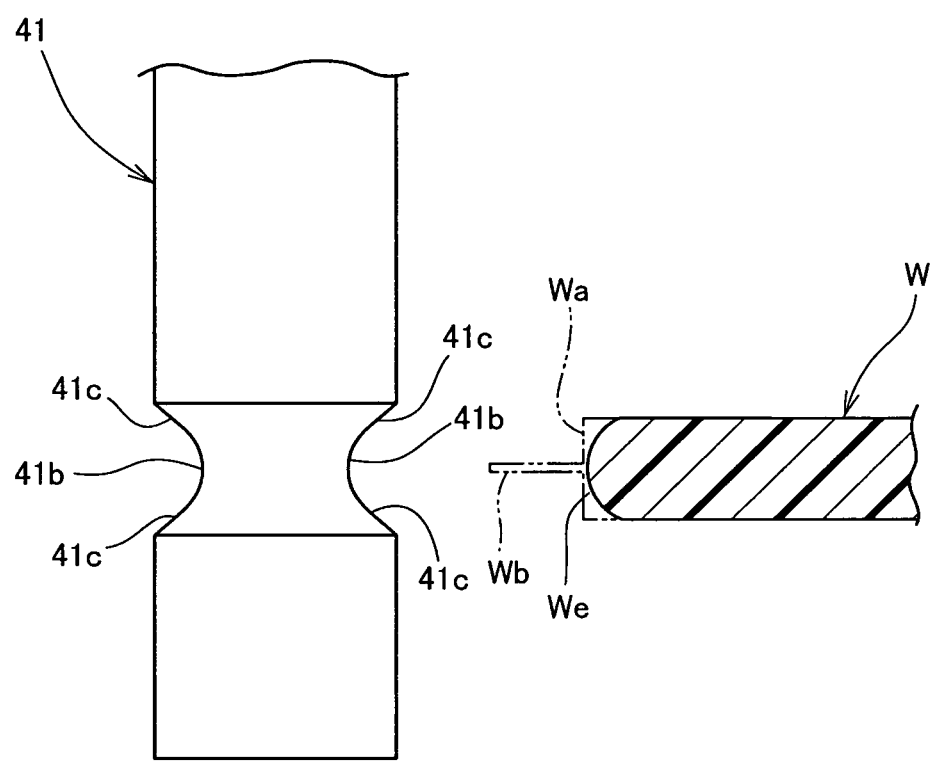
FIG. 5 is an illustration diagram of a rotatable tool and a workpiece.

FIG. 5 is an illustration diagram of the rotatable tool 41 and the workpiece W.

The rotatable tool 41 includes two cutting blades 41b formed as an annular recess portion at a distal end portion thereof. Each cutting blade 41b is formed so as to have a circular arc shape in cross-section. Therefore, when the end surface Wa of the workpiece W is machined by rotating the cutting blades 41b, a projecting, circular arc-shaped round (what is called round chamfer) Wc is formed at an edge of the workpiece W. If the end surface Wa of the workpiece W before machining includes a burr Wb, the burr Wb is also cut off and thereby removed by the cutting blades 41b.

On each of opposite sides of the cutting blade 41b, a relief portion 41c having a linear shape in cross-section, the cross-sectional surfaces of the relief portions 41c being continuous with the respective circular arc of the cutting blade 41b.

Next, operation of the above-described machining apparatus 10 will be described.

As illustrated in FIG. 3, for the workpiece W fixed on a working table, the articulated robot 11 (see FIG. 1) and the machining unit 13 (see FIG. 1) are actuated to position the band-like portion Wc of the workpiece W substantially on the blade portion center line 60, between the rotatable tool 41 and the profiling roller 57.

Then, the centering cylinder device 51 is actuated to center the pair of pinching rollers 65 and 65 as indicated by arrows A and A so that the band-like portion Wc of the workpiece W is pinched by the pair of pinching rollers 65 and 65.

Here, the pair of pinching rollers 65 and 65 moves closer to the blade portion center line 60 from respective positions that are the respective distances L1 and L1 from the blade portion center line 60 to respective positions that are the respective distances L2 and L2 from the blade portion center line 60.

As a result, the workpiece W is positioned on the blade portion center line 60. Next, the profiling cylinder device 55 is actuated to move the profiling body portion 54 to the rotatable tool 41 side as indicated by white arrow B. As a result, the end surface Wa (see FIG. 5) of the workpiece W is brought into abutment with the cutting blades 41b of the rotatable tool 41 and the profiling roller 57 is brought into abutment with the part to be profiled Wd of the workpiece W.

Then, in this state, the rotatable tool 41 is rotated and the articulated robot 11 and the machining unit 13 jointly move the machining unit 13 along the band-like portion Wc. Consequently, chamfering of the workpiece W and, if the end surface Wa of the workpiece W includes a burr Wb, deburring are continuously performed.

Here, the distance δ between the axis line 41a of the rotatable tool 41 and the axis line 57a of the profiling roller 57 are controlled so that the distance δ is varied by the profiling cylinder device 55 according to the height (width) of the band-like portion Wc of the workpiece W, and thus, even if the height (width) of the band-like portion Wc varies in a longitudinal direction of the workpiece, chamfering of the band-like portion Wc to have a fixed shape can consistently be performed by the cutting blades 41b of the rotatable tool 41. Therefore, a quality of the workpiece W subjected to secondary processing can be enhanced.

Even assuming that the band-like portion Wc of the workpiece W has a fixed height (width) in FIGS. 3 and 4, the band-like portion Wc may deform so as to undulate in the width direction as viewed in the longitudinal direction of the workpiece. In this embodiment, even if the band-like portion Wc undulates in the width direction, the first slide mechanism 26 (see FIG. 1) functions and thus the profiling roller 57 and the rotatable tool 41 follow the undulation, whereby secondary processing is performed with extremely high precision.

Also, the band-like portion Wc of the workpiece W may deform so as to undulate vertically in FIG. 3 as viewed in the longitudinal direction of the workpiece in FIGS. 3 and 4. In the present embodiment, even if the band-like portion Wc undulates vertically in FIG. 3, the second slide mechanism 28 (see FIG. 1) functions and thus the profiling roller 57 and the rotatable tool 41 follow the undulation, whereby secondary processing can be performed with extremely high precision.

The pair of pinching rollers 65 and 65 pinch the workpiece W while rotating, and the profiling roller 57 profiles the workpiece W while rotating, and thus, the workpiece W is positioned relative to the cutting blades 41b of the rotatable tool 41 while the workpiece W is profiled, enabling smooth operation during machining. Consequently, chamfering and deburring of the workpiece W can quickly be performed.

Although the above embodiment has been described in terms of the case where the rotatable tool 41 is a machining tool including cutting blades 41b facing the profiling roller 57, the rotatable tool 41 is not limited to a chamfering tool, and may be, for example, a general end mill or rotary bur having cutting blade(s) over an entire axial length.

Second Embodiment

Figure 6:
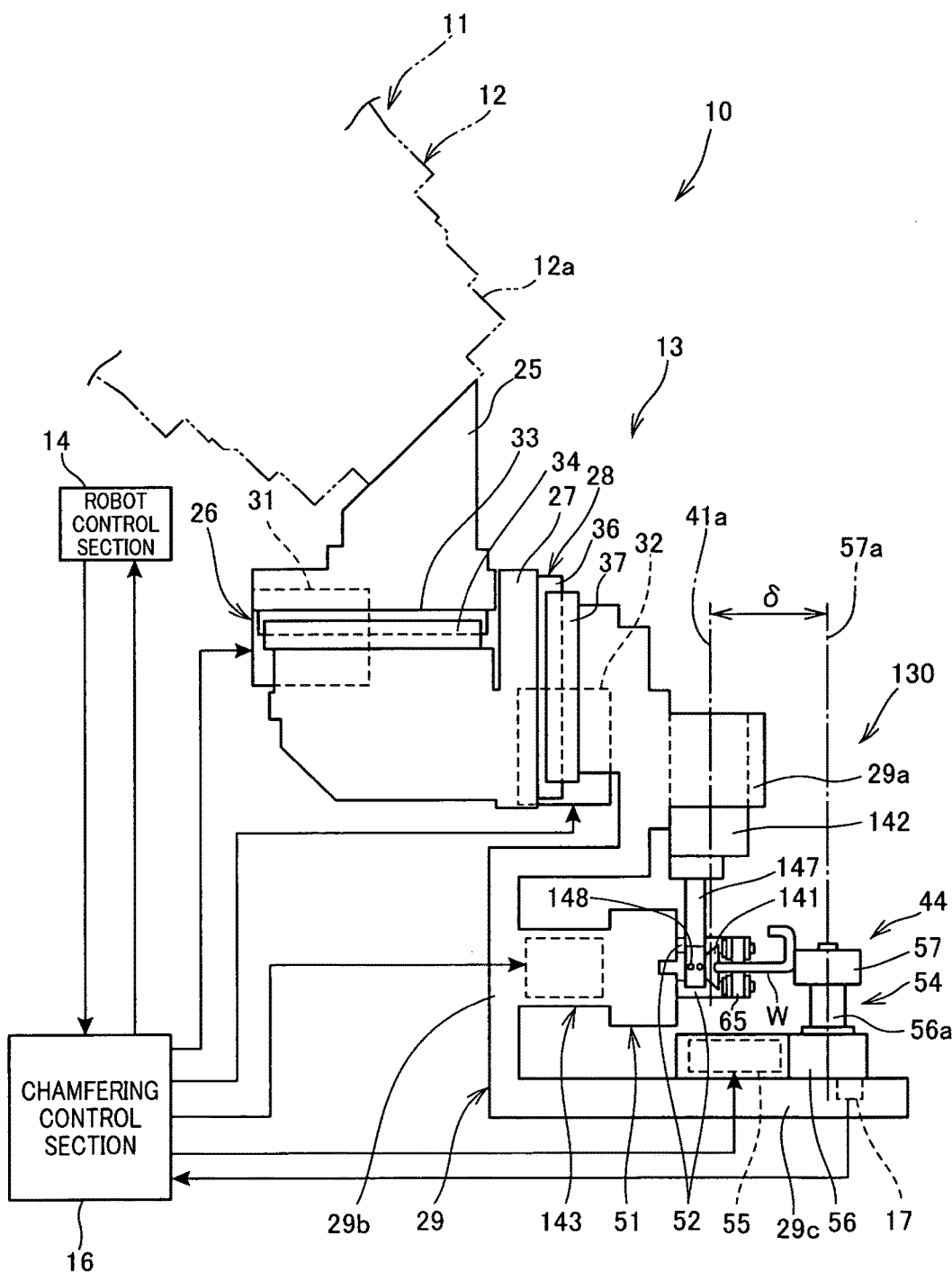
FIG. 6 is a diagram of a machining apparatus according to a second embodiment of the present invention.
Figure 7:
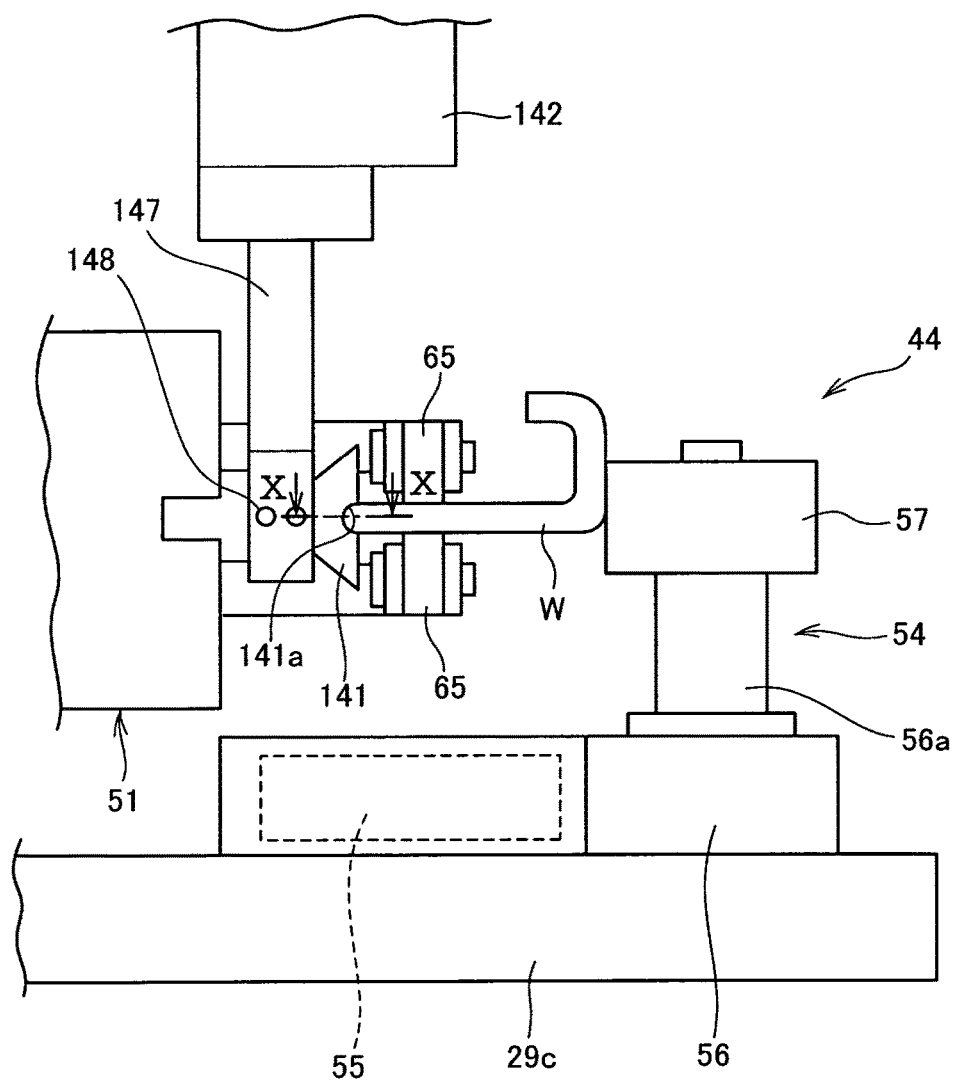
FIG. 7 is a side view of a major part of a machining unit.
Figure 8:
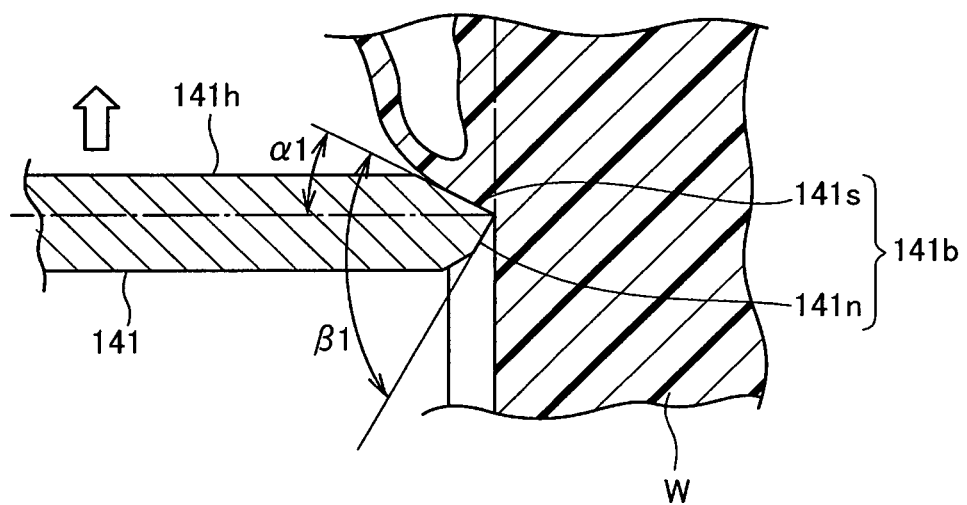
FIG. 8 is a side view of a scraper.

FIG. 6 is a diagram illustrating a machining apparatus 10 according to a second embodiment, FIG. 7 is an enlarged view of the diagram, and FIG. 8 is a cross-sectional view along line X-X in FIG. 7. In FIGS. 6 and 7, parts that are the same as those of FIG. 1 are provided with reference numerals that are the same as those of FIG. 1, and description thereof will be omitted.

In the second embodiment, instead of the rotatable tool 41 (see FIG. 1), a scraper 141 is provided. In other words, with reference to FIGS. 6 and 7, a machining section 130 of the second embodiment includes a machining body portion 142, and the machining body portion 142 includes a chuck 147 fixed on an upper portion 29a of a movable body 29. The scraper 141 is positioned and fixed on the chuck 147 via a plurality of screws 148. The scraper 141 has a flat plate-shaped cutter and extends in parallel with an axis line 57a of a profiling roller 57. The scraper 141 is formed of a cemented carbide and is prevented from blade breakage or chipping. Since a cemented carbide has a high natural frequency, chatter vibration is prevented.

As illustrated in FIG. 7, a cutting blade 141b having a recess shape for performing chamfering and deburring of an end surface of a workpiece W is formed in the scraper 141. As illustrated in FIG. 8, the cutting blade 141b includes a rake face 141s and a relief face 141n as viewed in cross-section. In the cutting blade 141b, an angle α1 formed between the rake face 141s and a surface 141h of the scraper is set to, for example, 5° to 30°, and an angle (blade edge angle) β1 between the rake face 141s and the relief face 141n is set to, for example, 60° to 120°.

This scraper 141 is provided as a machining tool including a cutting blade 141b facing the profiling roller 57.

Next, operation of the second embodiment will be described.

As illustrated in FIG. 7, upon the scraper 141 being moved in the arrow direction in FIG. 8 in a state that the workpiece W is held between the scraper 141 and the profiling roller 57, deburring and chamfering of the end surface of the workpiece W is performed by the cutting blade 141b at a blade edge of the scraper 141.

In deburring and chamfering, the blade edge of the scraper 141 is thrust against the end surface of the workpiece W with a predetermined thrust force. The thrust force is desirably, for example, within a range of 0.5 to 50 (N). The thrust force within the range enables chamfering providing an excellent finish to be performed while securing a sufficient amount of cutting. If the thrust force is a load exceeding 50 (N), the amount of cutting increases and chatter vibration occurs in the scraper 141, resulting in deterioration in finish of the machined surface, and if the thrust force is less than 0.5 (N), the amount of cutting is so small that no sufficient deburring can be performed.

A speed of movement of the scraper is set to, for example, 10 to 1500 mm/sec. The movement speed within the above range enables chamfering providing an excellent finish to be performed while securing a sufficient amount of cutting. On the other hand, if the movement speed is less than 10 mm/sec, the amount of cutting increases and chatter vibration occurs, resulting in deterioration in the finished surface, and if the movement speed exceeds 1500 mm/sec, the amount of cutting is so small that no sufficient deburring can be performed.

As illustrated in FIG. 8, a position of the scraper 141 is controlled so that the surface 141h of the scraper is perpendicular to the surface to be machined of the workpiece W.

Since the surface 141h of the scraper is perpendicular to the surface to be machined of the workpiece W, a rake angle in chamfering is a negative rake angle corresponding to the angle α1 (for example, 5° to 30°) formed by the rake face 141s and the scraper surface 141h. If the rake angle is a negative rake angle within a range of 5° to 30°, chamfering providing an excellent finish can be performed while securing a sufficient amount of cutting. If the rake angle is a positive rake angle or a negative rake angle of less than 5°, the amount of cutting increases and chatter vibration occurs, resulting in deterioration in finish of the machined surface, and if the rake angle is a negative angle exceeding 30°, the amount of cutting is so small that no sufficient deburring can be performed.

In the present embodiment, as in the first embodiment, even if a height (width) of a band-like portion Wc varies in longitudinal direction of the workpiece, chamfering of the band-like portion Wc to have a fixed shape can be performed by the cutting blade 141b of the scraper 141. Therefore, a quality of the workpiece W subjected to secondary processing can be enhanced.

Also, even assuming that the band-like portion Wc of the workpiece W has a fixed height (width) in FIGS. 3 and 4, the band-like portion Wc may deform so as to undulate in the width direction as viewed in the longitudinal direction of the workpiece. In this embodiment, even if the band-like portion Wc undulates in the width direction, the first slide mechanism 26 (see FIG. 1) functions and thus the profiling roller 57 and the scraper 141 follow the undulation, whereby secondary processing is performed with extremely high precision.

Also, the band-like portion Wc of the workpiece W may deform so as to undulate vertically in FIG. 3 as viewed in the longitudinal direction of the workpiece in FIGS. 3 and 4. In the present embodiment, even if the band-like portion Wc undulates vertically in FIG. 3, the second slide mechanism 28 (see FIG. 1) functions and thus the profiling roller 57 and the scraper 141 follow the undulation, whereby secondary processing can be performed with extremely high precision. A pair of pinching rollers 65 and 65 pinch the workpiece W while rotating and the profiling roller 57 profiles the workpiece W while rotating, and thus, the workpiece W is positioned relative to the cutting blade 141b of the scraper 141, and thus, the workpiece W is profiled, enabling smooth operation during machining. Consequently, effects such as enabling quick chamfering and deburring of the workpiece W can be provided.

Third Embodiment

Figure 9:
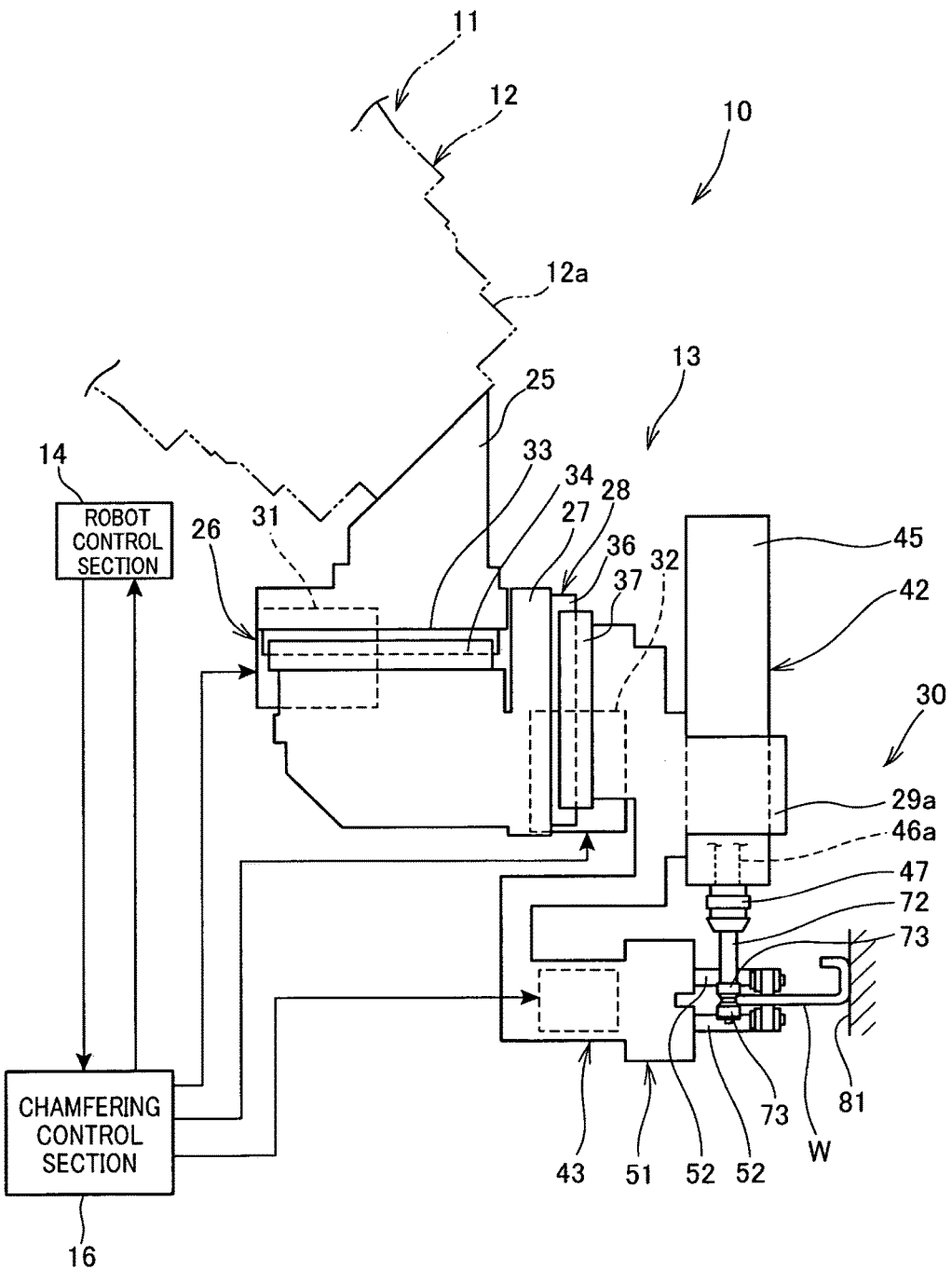
FIG. 9 is a diagram illustrating a machining apparatus according to a third embodiment of the present invention.
Figure 10:
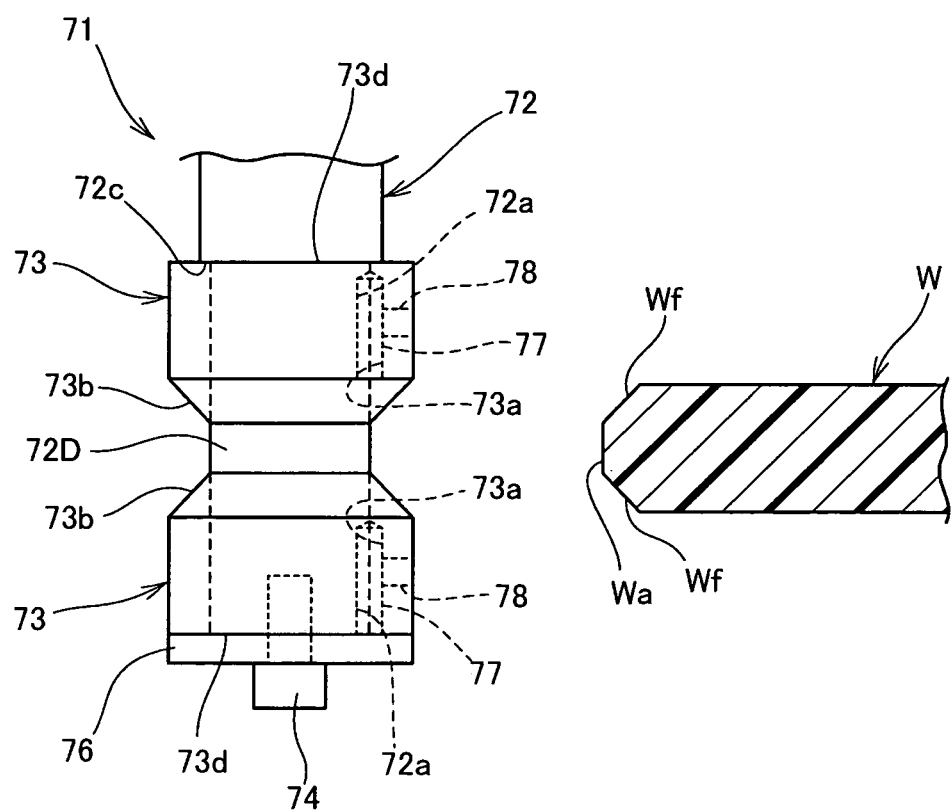
FIG. 10 is an illustration diagram of a rotatable tool of the third embodiment and a workpiece.

FIG. 9 is a diagram illustrating a machining apparatus 10 according to a third embodiment, and FIG. 10 is an enlarged view of a rotatable tool 71. In FIGS. 9 and 10, parts that are the same as those of FIG. 1 are provided with reference numerals that are the same as those of FIG. 1, and description thereof will be omitted. In the third embodiment, unlike the first embodiment, no profiling roller is employed. In this machining apparatus 10, a workpiece W is fixed via a fixing jig, illustration of which is omitted in the figures, and with a part to be profiled of the workpiece W is thrust against a fixed portion 81, chamfering and deburring of the workpiece W is performed via a rotatable tool 71.

The rotatable tool 71 includes a shaft portion 72 attached to a chuck 47 (see FIG. 1), a pair of blade portions 73 and 73 attached to a distal end portion of the shaft portion 72, and a washer 76 that abuts against an end surface 73d of one blade portion 73 and is attached to an end surface of the shaft portion 72 via a bolt 74 in order to prevent the one blade portion 73 from coming off from the shaft portion 72.

The shaft portion 72 includes a small diameter portion 72D at a distal end portion, the small diameter portion 72D functioning as what is called a part to be profiled, and keyways 72a and 72a extending in an axial direction are formed in an outer peripheral surface of the small diameter portion 72D, a keyway 73a is formed in an inner peripheral surface of each of the pair of blade portions 73 and 73, and each blade portion 73 is locked via a key 77 inserted in the corresponding keyways 72a and 73a.

Also, each blade portion 73 is restricted from movement in the axial direction via a hexagon socket set screw 78 threadably coupled to a female thread extending from an outer peripheral surface to the inner peripheral surface.

The blade portions 73 include two cutting blades 73b for cutting an end surface Wa of a workpiece W to form chamfered parts Wf and Wf.

An end surface 73d of one blade portion 73 is abutted against a step portion 72c formed at a root of the small diameter portion 72D and thereby the blade portion 73 is positioned in the axial direction. An end surface 73d of the other blade portion 73 is abutted against the washer 76 and thereby the other blade portion 73 is positioned.

Operation of the rotatable tool 71 described above will be described.

FIG. 11 includes operation diagrams illustrating chamfering via the rotatable tool 71. FIG. 11(A) is a diagram illustrating a state before chamfering, and FIG. 11(B) is a diagram illustrating a state during chamfering.

As illustrated in FIG. 11(A), a burr Wb is formed at an end surface Wa of a workpiece W. The pair of blade portions 73 and 73 is positioned relative to the workpiece W so that the cutting blades 73b and 73b of the pair of blade portions 73 and 73 cover the thickness of the workpiece W indicated by the imaginary lines. Then, as indicated by arrow D, the rotatable tool 71 is moved to the workpiece W side.

As illustrated in FIG. 11(B), the rotatable tool 71 is thrust against the end surface Wa of the workpiece W, and secondary processing for chamfering the workpiece W is performed. Here, since the small diameter portion 72D (profiling portion) is in abutment with the end surface Wa of the workpiece W, the part of the end surface Wa that is in abutment with the small diameter portion 72D is not machined.

As described above, the end surface Wa of the workpiece W is thrust against the small diameter portion 72D, whereby the workpiece W is positioned for profiling, and in this state, chamfering and deburring of opposite edges of the end surface Wa is performed, enabling enhancement in precision of the chamfering.

In the present embodiments, as illustrated in FIG. 1 or 6, the machining unit 13 is provided at the distal end portion 12a of the arm 12 of the articulated robot 11, and the machining unit 13 includes the profiling roller 57 as a roller that abuts against a part to be profiled Wd of a workpiece W, and the rotatable tool 41 or 71 having the axis line 41a extending in parallel with the axis line 57a corresponding to the support axis of the profiling roller 57, the distance between the rotatable tool 41 or 71 and the profiling roller 57 being made to correspond to a width of the workpiece W (width of the band-like portion Wc), and the rotatable tool 41 or 71 include the cutting blades 41b or the cutting blades 73b and 73b as chamfering blades.

With this configuration, the profiling roller 57 is brought into abutment with the part to be profiled Wd of the workpiece W and a distance between the part to be profiled Wd and the rotatable tool 41 or 71 is made to correspond to the width of the workpiece W, enabling the rotatable tool 41 or 71 to be positioned against the workpiece W, and thus enabling chamfering to be performed with high precision while specified dimensions of the workpiece W is maintained.

Also, as illustrated in FIGS. 9, 10 and 11(A) and 11(B), since the blade portions 73 and 73 include the cutting blades 73b and 73b as a pair of blade portions spaced in the axial direction, when chamfering the workpiece W via the pair of cutting blades 73b and 73b spaced in the axial direction, the workpiece W can be positioned by thrusting the workpiece W against a part of the rotatable tool 71 between the pair of the cutting blades 73b and 73b, more specifically, the small diameter portion 72D of the shaft portion 72, enabling enhancement in precision of the secondary processing for chamfering.

Also, as illustrated in FIGS. 3 and 6, the machining unit 13 includes the pinching arms 63 and 63, which serve as a pinching jig for a workpiece W, the pinching jig including the pinching rollers 65 and 65 as a pair of rollers, the blade portions 73 and 73 and the workpiece W are positioned in a state that the workpiece W is held between the pair of pinching rollers 65 and 65, and thus, the workpiece W can be positioned relative to the blade portions 73 and 73 with high precision as a result of the workpiece W being pinched by the pinching arms 63 and 63, enabling enhancement in precision of chamfering of the workpiece W.

Also, the pair of pinching rollers 65 and 65 is moved to open (away from each other)/close (closer to each other) via the centering cylinder device 51, which serves as a centering mechanism, and thus the workpiece W can consistently be positioned at a predetermined position relative to the blade portions 73 and 73 by the centering cylinder device 51, enabling further enhancement in precision of chamfering of the workpiece W.

Also, since the profiling cylinder device 55 serving as an actuator that varies the distance between the profiling roller 57 and the rotatable tool 71 (or the rotatable tool 41) is included, the distance between the profiling roller 57 and the rotatable tool 71 (or the rotatable tool 41) is varied by the profiling cylinder device 55 according to the width of the workpiece W, whereby chamfering can be performed according to the shape of the workpiece, enabling enhancement in versatility.

Also, as illustrated in FIG. 1, control data for the profiling cylinder device 55 and control data for the articulated robot 11 are synchronized, for example, teaching data for the workpiece W, which is control data for the articulated robot 11, and the distance between the profiling roller 57 and the rotatable tool 41, which is control data for the profiling cylinder device 55, are synchronized, and thus, enabling the workpiece W to be chamfered with high precision.

Also, the profiling roller 57 and the rotatable tool 41 (or the rotatable tool 71) are integrally supported by the movable body 29 and the movable body 29 is joined to the base body 25 of the machining unit 13 via the first slide mechanism 26, which serves as a first floating mechanism, and thus the profiling roller 57 and the rotatable tool 41 (or the rotatable tool 71) can be moved relative to the base body 25 of the machining unit 13 via the first slide mechanism 26, enabling the profiling roller 57 and the rotatable tool 41 (or the rotatable tool 71) to easily follow the shape of the workpiece W.

Also, the slider 27 is joined to the base body 25 of the machining unit 13 via the first slide mechanism 26 and the movable body 29 is joined to the slider 27 via the second slide mechanism 28, which serves as a second floating mechanism, and thus the profiling roller 57 and the rotatable tool 41 (or the rotatable tool 71) can be moved relative to the base body 25 of the machining unit 13 via the first slide mechanism 26 and the second slide mechanism 28, whereby the profiling roller 57 and the rotatable tool 41 (or the rotatable tool 71) can more easily follow the shape of the workpiece W, enabling enhancement in following capability. Therefore, the precision of chamfering of the workpiece W can be enhanced.

With the above-described configuration, the workpiece W can be chamfered by the pair of cutting blades 73b and 73b while the workpiece W is brought into abutment with the small diameter portion 72D between the cutting blades 73b and 73b, enabling chamfering to be performed easily with the simple structure and thus enabling cost reduction and productivity enhancement.

Also, as illustrated in FIGS. 11(A) and 11(B), the workpiece W is chamfered simultaneously with deburring, and thus chamfering and deburring of the workpiece W are simultaneously performed, enabling enhancement in productivity compared to the cases where chamfering and deburring are separately performed.

Each of the above-described embodiments indicates only an aspect of the present invention, and can be altered and applied arbitrarily within the scope not departing from the spirit of the present invention.

For example, although in one of the above-described embodiments, as illustrated in FIG. 11, the blade portions 73 and 73 are provided separately from the rotatable tool 71, the present invention is not limited to this embodiment, a pair of blade portions for chamfering may be formed integrally with the shaft portion 72 of the rotatable tool 71. Although as illustrated in FIGS. 5 and 11(A), the present embodiments have been described in terms of cases where if a workpiece W includes a burr wb, chamfering and deburring of the workpiece W are simultaneously performed by the machining apparatus 10, the present invention is not limited to this embodiment, even if the workpiece W includes no burr, chamfering is performed by the machining apparatus 10.

The rotatable tool 41 (or the rotatable tool 71) may be, e.g., an end mill or a rotary bur including cutting blade(s) extending over an entire axial length.

REFERENCE SIGNS LIST 10 machining apparatus
11 articulated robot
12 arm
12a distal end portion
13 machining unit
25 base body
26 first slide mechanism (first floating mechanism)
27 slider
28 second slide mechanism (second floating mechanism)
29 movable body
41, 71 rotatable tool
41b cutting blade (chamfering blade)
51 centering cylinder device (centering mechanism)
55 profiling cylinder device (actuator)
57 profiling roller (roller)
57a axis line (support axis of roller)
63 pinching arm (pinching jig)
65 pinching roller (rollers)
72D small diameter portion (profiling portion)
73 blade portion (chamfering blade)
73b cutting blade
W workpiece
Wb burr
Wd part to be profiled
Wf part to be chamfered

The invention claimed is:

1. A machining apparatus for machining a workpiece including a surface to be machined at one side edge and a part to be abutted at another side edge, the machining apparatus comprising:

a profiling member having a reference surface that abuts against the part to be abutted so as to locate the workpiece;
a machining tool provided in such a manner that the workpiece is held between the profiling member and the machining tool, and in such a manner that a distance between the machining tool and the profiling member corresponds to a width of the workpiece;
a machining unit including a workpiece pinching jig including a pair of rollers, the machining unit is moved in a state that the workpiece is held between the pair of rollers such that the surface to be machined of the workpiece is machined by the machining tool;
a movable body on which the profiling member and the machining tool are both supported, wherein the movable body is slidably joined to a slider via a slide mechanism; and
a base body to which the slider is slidably joined via a further slide mechanism.

2. The machining apparatus according to claim 1, comprising an actuator capable of varying the distance between the profiling member and the machining tool.

3. The machining apparatus according to claim 1, wherein the profiling member is a roller.

4. The machining apparatus according to claim 1, wherein an actuator is provided to slide the profiling member towards and away from the machining tool.

5. The machining apparatus according to claim 1, wherein the pair of rollers is moved to open and close via a centering mechanism.

6. The machining apparatus according to claim 1, wherein the machining tool is a rotatable tool.

7. The machining apparatus according to claim 1, wherein the machining tool is a scraper.

8. The machining apparatus according to claim 1, wherein the profiling member includes a roller, an axis of which extends in parallel with an axis line of the machining tool.

9. The machining apparatus according to claim 1, wherein the machining tool is a rotatable tool including a pair of cutting blades.

10. The machining apparatus according to claim 9, wherein the profiling member is a roller.

11. The machining apparatus according to claim 9, wherein an actuator is provided to slide the profiling member towards and away from the machining tool.

12. The machining apparatus according to claim 1, wherein the machining tool is configured to perform chamfering of the workpiece.

13. The machining apparatus according to claim 12, wherein the pair of rollers is moved to open and close via a centering mechanism.

* * * * *